Figures 1, 3:
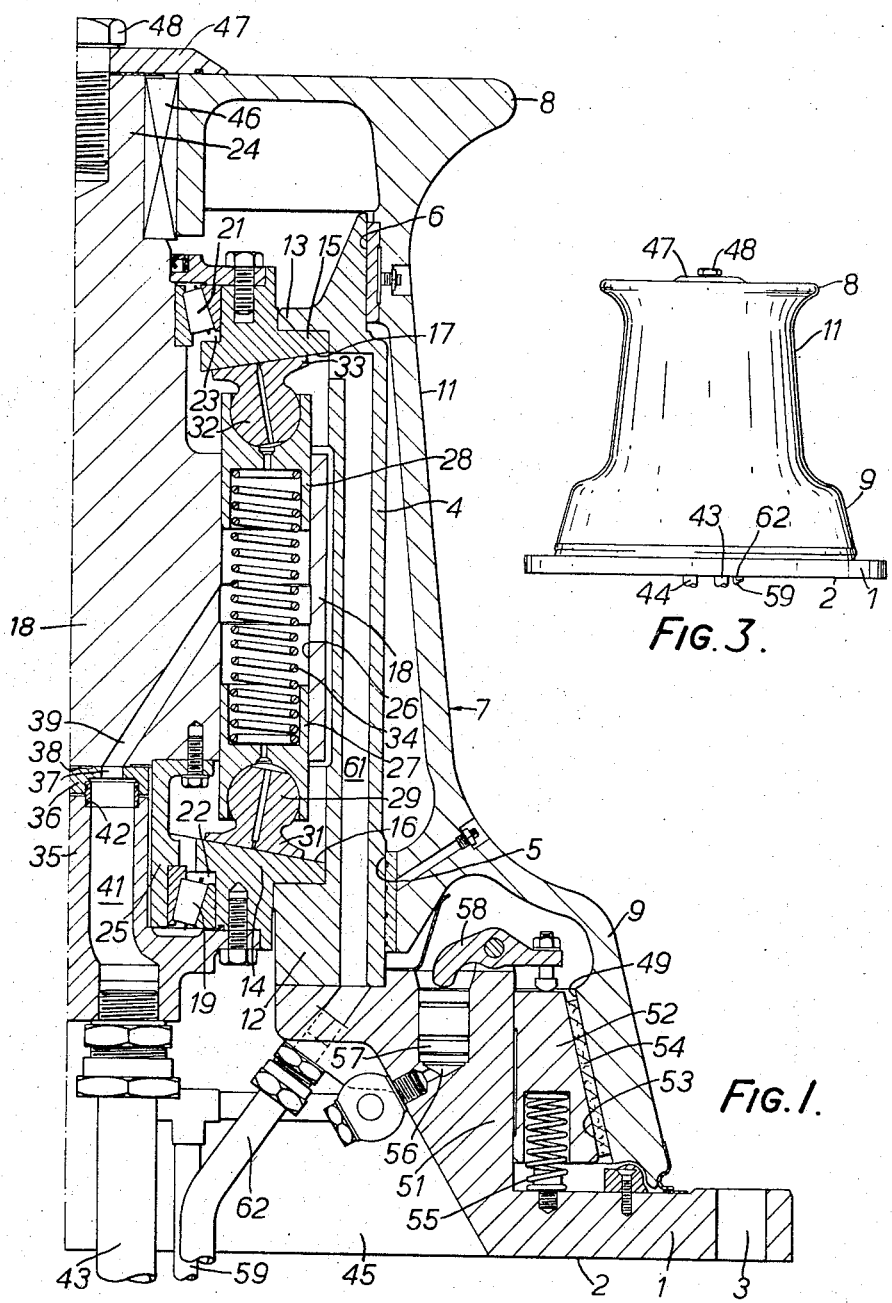

Sept. 5, 1967  D. J. MILLARD  3,339,894
WINDING MACHINES
Filed Nov. 29, 1965  2 Sheets-Sheet 1

INVENTOR
DENNIS J. MILLARD
BY
Orland M. Christensen
ATTORNEY

Sept. 5, 1967     D. J. MILLARD     3,339,894

WINDING MACHINES

Filed Nov. 29, 1965     2 Sheets-Sheet 2

INVENTOR
DENNIS J. MILLARD
BY
ATTORNEY though this tube is formed separately from the base it is securely fixed to the base. The tube 4 includes a pair of axially spaced cylindrical bearing surfaces 5 and 6 on which the winding drum is of conventional external shape in that it includes upper and lower portions 8 and 9 of increased diameter and a central portion 11 of reduced diameter. A cable wound on to the capstan will normally engage the portion 11 and the end portions 8 and 9 will prevent the cable slipping off the drum in the axial direction. The tube 4 includes upper and lower inwardly directed flanges 12 and 13. A lower swash plate 14 is supported against the flange 12 and an upper swash plate 15 is supported against the flange 13. The tube 4 and the flanges 12, 13 are formed in two similar parts which have adjoining surfaces extending parallel to the axis of the tube 4. This construction of the tube 4 will facilitate the assembly of the swash plates and other motor parts within the tube 4. The swash plates are secured against rotation on the flanges 12 and 13 by means of dowel pins (not shown) inserted through the tube 4 into the swash plates. The swash plate 14 includes a flat surface 16 inclined to the axis of the tube 4 whilst the swash plate 15 includes a flat surface 17 inclined to the axis of the tube 4 equally and oppositely having regard to the surface 16.

3,339,894
WINDING MACHINES
Dennis J. Millard, Finchfield, Wolverhampton, England, assignor to Boulton Paul Aircraft Limited
Filed Nov. 29, 1965, Ser. No. 510,280
Claims priority, application Great Britain, Apr. 23, 1965, 17,290/65
5 Claims. (Cl. 254—150)

This invention relates to winding machines such for example as capstans, winches, conveyor driving drums and the like. A capstan is a cable winding machine having a power driven winding drum over which the cable extends for one or two turns being manually or otherwise pulled from or fed to the drum at low tension during winding, the friction of the cable on the drum enabling the cable to be wound on or off the drum by rotation thereof at a considerable tension. A winch is a cable winding machine having a power driven winding drum on which the cable is attached and which is adapted to hold many turns of cable, rotation of the drum winding cable on or off the drum.

The power drive of a winding machine such for example as a capstan or a winch frequently includes a mechanical power source and a train of reduction gears externally disposed relative to the winding drum. The power source and reduction gears then require accommodation in addition to the drum and in many uses such for example as on board ship the power source and reduction gears are accommodated only with considerable difficulty and the use of valuable space.

In accordance with the present invention a winding machine comprises a stationary mounting base, bearing means supporting a drum for rotation on the base, and a positive displacement hydraulic motor located within the bounds of the base and the drum, the motor being directly connected for rotation of the drum relative to the base.

The motor may be of the axial piston kind which includes a plurality of cylinders disposed parallel or nearly parallel to the drum rotation axis. Further each cylinder may include a pair of pistons adapted for opposite movement.

A friction brake may be provided to act internally of the drum between the base and the drum.

The friction brake may be spring loaded into the braking position and may include hydraulic means for releasing the brake against the spring load.

The hydraulic connection for the hydraulic motor may be connected also to the hydraulic means whereby the brake is applied when the hydraulic pressure is not supplied to rotate the drum.

Where the motor is a reversible motor having a pair of hydraulic connections which will alternatively carry pressure liquid depending on the selected direction of rotation, the hydraulic means may be connected by a pair of non-return valves to the two connections such that the higher pressure of the two connections is always fed to the hydraulic means.

Figure 2:
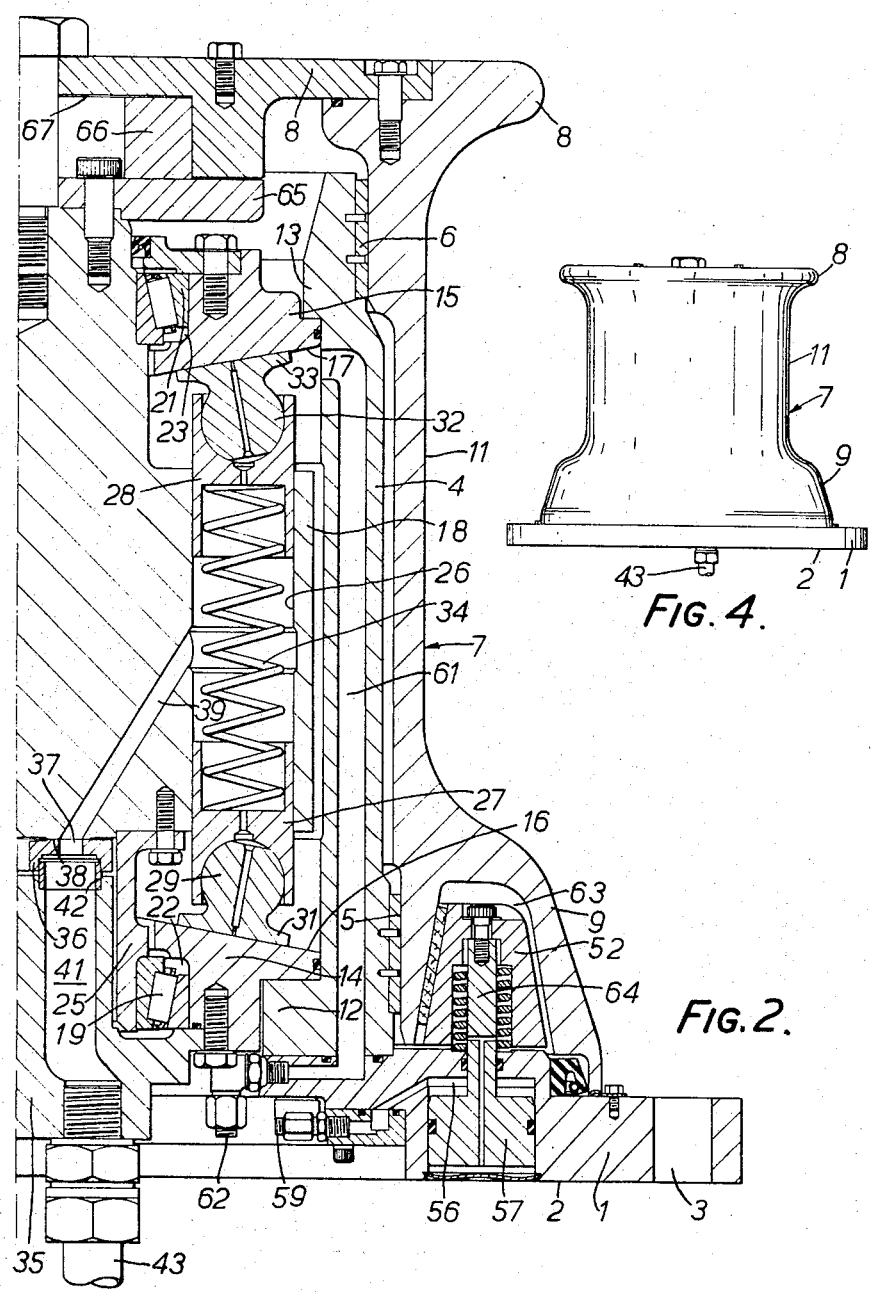
Figure 4:
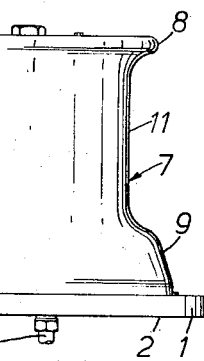

How the invention can be carried into effect is hereinafter particularly described with reference to the accompanying drawings in which, FIGURE 1 is a partial section of a capstan according to the invention, FIGURE 2 is a partial section of a further form of capstan according to the invention, and FIGURES 3 and 4 are elevations of the capstans of FIGURES 1 and 2 respectively.

Reference is made initially to FIGURE 1 of the accompanying drawings. A base 1 of the capstan has a flat undersurface 2 and a plurality of bolt holes 3 around its periphery by which the whole capstan may be secured in position on a convenient flat surface. Projecting centrally from the base perpendicularly to the surface 2 is a cylindrical thick walled tube 4 of comparatively large diameter. Although this tube is formed separately from the base it is securely fixed to the base. The tube 4 includes a pair of axially spaced cylindrical bearing surfaces 5 and 6 on which the winding drum is of conventional external shape in that it includes upper and lower portions 8 and 9 of increased diameter and a central portion 11 of reduced diameter. A cable wound on to the capstan will normally engage the portion 11 and the end portions 8 and 9 will prevent the cable slipping off the drum in the axial direction. The tube 4 includes upper and lower inwardly directed flanges 12 and 13. A lower swash plate 14 is supported against the flange 12 and an upper swash plate 15 is supported against the flange 13. The tube 4 and the flanges 12, 13 are formed in two similar parts which have adjoining surfaces extending parallel to the axis of the tube 4. This construction of the tube 4 will facilitate the assembly of the swash plates and other motor parts within the tube 4. The swash plates are secured against rotation on the flanges 12 and 13 by means of dowel pins (not shown) inserted through the tube 4 into the swash plates. The swash plate 14 includes a flat surface 16 inclined to the axis of the tube 4 whilst the swash plate 15 includes a flat surface 17 inclined to the axis of the tube 4 equally and oppositely having regard to the surface 16.

Centrally within the tube 4 a cylinder block 18 is mounted for rotation by means of taper roller bearings 19 and 21 located in central holes 22 and 23 within the swash plates 14 and 15. A drive shaft 24 extends through the upper bearing 21. The cylinder block is located at the lower bearing 19 by means of a hollow stub axle 25 bolted on to the lower end of the block.

Within the block 18 a plurality of cylinders 26 are formed, each of which extends from end to end of the block, each lying parallel to the rotation axis of the cylinder block. Within each cylinder a pair of pistons 27 and 28 are mounted, these pistons extending one from either end of the cylinder. The outer end of piston 27 is socketed to receive ball 29 which carries slipper pad 31 engaging against the swash plate surface 16. The outer end of cylinder 28 is socketed to receive ball 32 which carries slipper 33 engaging against the surface 17. A compression spring 34 within the cylinder 26 urges the two pistons apart so that these slippers 31 and 33 engage their respective surfaces 16 and 17.

A spigot 35 carried by swash plate 14 enters the hollow stub axle 25 and at its inner end carries a floating valve plate 36. The valve plate includes a pair of kidney shaped ports 37 and engages against a valve surface 38 formed at the cylinder block. A plurality of secondary branch lines or ports 39 extending one from each cylinder open into the surface 38 for co-operation with the kidney ports 37. A pair of main hydraulic feed lines or passages 41 extend through the spigot 35, each locating a hollow sleeve 42 at the end adjacent to the valve plate. Each hollow sleeve 42 enters a co-operating recess in the valve plate 36 behind each kidney port 37. The plate 36 is arranged to be slidable on the sleeves 42 to urge itself into seating engagement with the block surface 38. A pair of hydraulic pipes 43 and 44 extend from the passages 41 through a suitable hole 45 in the base 1. These pipes will carry hydraulic supply and return liquid.

The drive shaft 24 extending from the upper end of the cylinder block 18 is secured to the upper portion 8 of the drum 7 by means of one or more keys 46 so that rotational drive from the cylinder block 18 is transmitted to the drum 7. The drum is located on shaft 24 in the endwise sense by means of a large washer 47 and a bolt 48.

Internally of the enlargement 9 at the lower end of the drum 7 a conical braking surface 49 is formed coaxially with the drum. Within the lower end of the drum the base 1 is formed with an upstanding cylindrical projection 51 which principally serves to mount the tube 4. Around the periphery of projection 51 a circular brake shoe 52 is mounted capable of sliding movement in the axial direction but restrained by guides (not shown) against rotational movement. The outer surface 53 of the brake shoes is of conical shape and includes a friction lining 54 mounted thereon for cooperation with the conical surface 49 of the drum. A plurality of springs 55 act between the brake shoe and the base to urge the brake shoe upwardly so that the friction material engages the surface 49 and locks the drum against rotation. Within the projection 51 a plurality of brake cylinders 56 are formed each including a piston 57 which under the influence of hydraulic pressure will act through a lever 58 on the brake shoe 52 to urge it downwardly against the spring loading. All of the cylinders 56 are hydraulically connected to a brake pipe 59.

The capstan is mounted in position on any convenient flat surface. A very small hole in the flat surface will carry the various hydraulic pipe connections of the motor and the brake to any convenient point remote from the capstan from which the capstan is to be controlled. Any conventional means may be used to supply hydraulic liquid to the motor, liquid being supplied to the appropriate pipe 43 or 44 depending on the direction of rotation that is required. In the drawing the pistons 27 and 28 have been shown at the outermost positions of their stroke as determined by the parts of the surfaces 16 and 17 which they engage. In this position during operation the port 39 would not be in connection with either of the kidney ports 37 but would actually be passing from one kidney port to the other. However for convenience in illustration the section through the spigot 35 and the valve plate 36 has been taken in a different plane from the remainder of the drawing in order to show the kidney port in section. In order to cause the capstan drum to rotate hydraulic liquid is supplied to the appropriate pipe 43 or 44. A number of cylinders 26 will then be connected to the kidney port 37 receiving pressure liquid and the pistons in these cylinders will press outwardly against the inclined surfaces 16 and 17 causing the cylinder barrel to rotate. When the pistons have reached the outermost position of their stroke for example the piston as shown in the drawing, further rotation will cause them to move inwardly. At such a position however the cylinder ports 39 will have changed connection from the kidney port 37 at pressure to the kidney port 37 connected to the other of the two pipes 43 and 44 which returns to reservoir. Leakage from the cylinders 27 into the space between the cylinder block and the tube 4 is collected within the tube 4 and fed through passage 61 and pipe connection 62 back to reservoir. Rotation of the cylinder block acting through the drive shaft 24 and the keys 46 will rotate the drum 7 on its bearings 5 and 6 about the tube 4. The brake shoe 52 will be urged upwardly to frictionally lock the drum when the hydraulic pressure in the cylinder 56 falls to a low level. The hydraulic pressure in these cylinders will be controlled at the control point to lock or release the drum as desired.

Reference is now made to FIGURE 2 of the accompanying drawings. There is considerable similarity between the two figures and like reference numerals will refer to like parts. The differences in construction between FIGURES 2 and 1 only will be described. The cylindrical projection 51 is very much more shallow permitting the tube 4 to be mounted nearer the lower surface 2 of the base plate 1 thereby lowering the total overall height of the capstan. The enlargement 9 now extends from the central portion 11 of the drum to enclose a circular space 63 within which the brake shoe 52 is located. The friction surface of the drum against which the brake shoe operates is now formed at the lower end of the portion 11 directly opposite to the bearing 5. The hydraulic piston and cylinder units 56, 57 will now be formed in the base 1 directly beneath the brake shoe 52. Each piston 57 includes a piston rod 64 extending up into the brake shoe 52. The hydraulic working space within the cylinder 56 is now that defined at the upper end of the cylinder 56 between the piston 57 and the piston rod 64. As in FIGURE 1 the cylinders 56 are all connected together into a common pipe 59. A pair of non-return valves (not shown) are provided extending from the pipes 43 and 44, the non-return valves being arranged so that the higher pressure in the pipes 43 and 44 is communicated to the connection 59. Thus whenever hydraulic pressure is applied to rotate the hydraulic motor such pressure will act within all the cylinders 56 to withdraw the brake shoe from frictional engagement with the drum.

The connection between the drive shaft 24 and the drum is different in that the upper end of the drive shaft now includes a plate 65 attached thereto on which is provided a diametric upward projection for engagement with an Oldham coupling 66. The upper end 8 of the drum is also altered to provide a recess 67 to receive the Oldham coupling, such recess also including a diametric projection to engage the Oldham coupling 66. The purpose of the Oldham coupling is to allow some manufacturing tolerance in the concentricity of the bearing 21 and the bearing 6 and also to ensure that radial loads exerted on the winding drum by a cable being wound on the drum will not pass through to the bearing 21 but will be absorbed completely by the bearings 5 and 6.

Whilst the described embodiments show that the hydraulic motor located within the bounds of the base and the drum is of the axial piston swash plate kind, it is within the broad scope of the present invention to employ any kind of hydraulic motor in this position. Normally speaking such a hydraulic motor will have a large hydraulic capacity per revolution where the drum is intended to rotate at low speeds with a very large driving torque.

I claim as my invention:

1. A winding machine comprising a stationary mounting base, a drum supported for rotation on and defining a space with the base, and hydraulic motor means for rotating the drum, including a plurality of cylinders disposed within the space defined by the drum and the base, on axes offset from but substantially parallel to the axis of rotation of the drum, a swash plate disposed obliquely to the aforesaid axis of rotation opposite the cylinders, pistons slidable in the cylinders to cooperate with the swash plate, and a hydraulic connection with the cylinders which is operable to cause the pistons to cooperate with the swash plate in rotating the drum, the swash plate being secured on the mounting base and the cylinders secured in the drum, and the hydraulic connection having a main feed line in the base and secondary branch lines in the drum which operatively interconnect with the main line on an alternate basis as the drum rotates, to connect first one cylinder and then another with hydraulic pressure.

2. A winding machine according to claim 1 wherein there is a swash plate disposed obliquely to the axis of rotation opposite each end of the cylinders, and each cylinder has a pair of pistons slidable therein for opposite movement during drum rotation.

3. A winding machine according to claim 1 further comprising a friction brake between the base and the drum which is spring loaded into the braking position, and hydraulic means for releasing the brake against the spring load.

4. A winding machine according to claim 3 wherein the hydraulic connection to the cylinders is operable to deactuate the hydraulic brake release means when the hydraulic pressure in the connection drops below a predetermined level.

5. A winding machine according to claim 4 wherein there is a pair of hydraulic connections with the cylinders to enable the drum to be rotated in either direction of rotation, and the hydraulic brake release means is fed hydraulic fluid through each connection, to release the brake in either direction of rotation, the feed being passed through a non-return valve in each case so that the hydraulic brake release means is controlled by only that connection in use.

References Cited

UNITED STATES PATENTS

| 1,244,668 | 10/1917 | Whaley | 254—186 |
| 1,582,076 | 4/1926 | Page | 254—186 |
| 3,244,405 | 4/1966 | Hanning | 254—186 |

FOREIGN PATENTS

| 4,288 | 11/1877 | Great Britain. |
| 4,297 | 3/1884 | Great Britain. |

EVON C. BLUNK, *Primary Examiner.*

ANDRES H. NIELSEN, *Examiner.*

H. C. HORNSBY, *Assistant Examiner.*